Feb. 13, 1940.  C. J. TERRILL  2,189,845
KNOB
Filed Aug. 19, 1938

Inventor:
Clair J. Terrill
By Ams, Thiess, Olsen & Mecklenburg
Attys.

Patented Feb. 13, 1940

2,189,845

UNITED STATES PATENT OFFICE 2,189,845

KNOB

Clair J. Terrill, Evanston, Ill., assignor to Harry Davies Molding Co., Chicago, Ill., a corporation of Illinois Application August 19, 1938, Serial No. 225,677

8 Claims. (Cl. 287—53)

This invention relates to self-fastening knobs or handles, and particularly to a so-called push-on knob or handle such as used on radio tuning devices or other control elements. The invention is also adaptable for knobs used for the control of various types of electrical switches and other mechanisms, or wherever it is desired to support a knob or similar element on a projecting shank.

In the present invention, the handle or knob preferably is made of molded material such as "Bakelite" or the like, and comprises a single unitary member forming a knob or the like having a cavity therein to receive the shank of any suitable mechanism to be operated by the knob. The invention is adaptable for the application of knobs to shanks having different cross sectional contours. However, it is particularly adapted for flat shanks formed of metallic ribbon-like material such as so-called strap metal or round shanks flattened on one or both sides.

The hollow knob may be provided with oppositely disposed comparatively thin resilient partitions or leaves extending from opposite sides of the cavity within the knob and which are arranged to frictionally engage on opposite sides of a shank when it is inserted therebetween and to retain the knob on the shank by the friction of the so-called leaf spring partitions.

It is an object of the present invention to provide a one-piece knob of molded material having integral resilient portions which will frictionally engage a shank when it is inserted therebetween and will retain the knob in sufficiently rigid relationship to the shank to permit normal operation of a control member by manipulation of the knob.

A further object is the provision of a one-piece knob formed to frictionally engage over the end of a shank and to be retained in operative position without the use of auxiliary fastening means and without the necessity for threading or otherwise forming the shank for securing engagement with the knob.

A further object is the provision of a one-piece molded knob which may easily be attached to a suitable shank by longitudinal telescopic movement thereon and which will be cheap to manufacture, easy to assemble with a shank, and which may easily be removed from or replaced on a shank.

It is also an object to provide an integral molded knob or handle which does not require any inserts or intricate molding operations and in which integral elements of the knob are resiliently positioned to frictionally engage the end of a shank when it is inserted therein, whereby the knob is retained snugly on the shank.

A further object is the provision of a knob of the character described which is so constructed that it may be aligned with a flat shank by rotary movement of the knob on the end of the shank.

Further objects will be apparent from the specification and appended claims.

Figure 1:
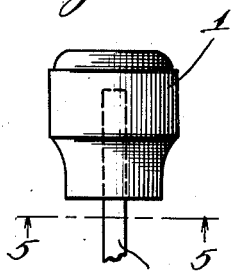
Fig. 1 is a side elevation of a knob or handle applied to a shank and illustrates one embodiment of the invention.
Figure 2:
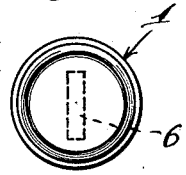
Fig. 2 is a top view of the embodiment illustrated in Fig. 1.
Figure 3:
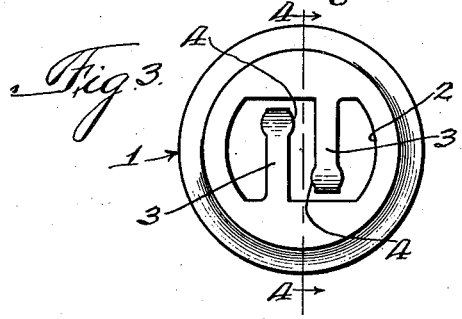
Fig. 3 is a bottom view of the embodiment illustrated in Fig. 1, with the shank removed.

Referring to the drawing in detail, the embodiment illustrated comprises a knob 1 which is preferably of molded material such as "Bakelite" or the like. Such material is very strong and is somewhat resilient, particularly when comparatively thin in cross section, and therefore is particularly adaptable for use in connection with this invention.

Figure 4:
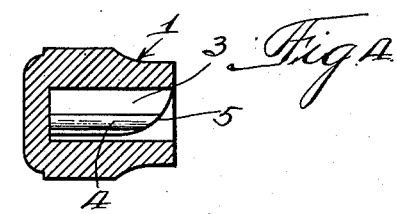
Fig. 4 is a detailed sectional view taken on a line substantially corresponding to line 4—4 of Fig. 3.

The knob 1 may be of any suitable shape and is preferably of an outside contour somewhat similar to that illustrated. The knob is provided with a chamber 2 molded therein and opening through the bottom of the knob. This chamber is provided with substantially vertical walls so that it may be formed by so-called straight molding and without the use of any of the various expedients commonly used for molding intricate contours. The chamber extends for a considerable depth into the knob, as illustrated in Fig. 4, and is provided on each side of the axial line of the knob with comparatively thin oppositely disposed partitions 3. These partitions extend from opposite walls of the chamber as shown and each partition terminates closely adjacent the opposite wall.

The adjacent sides of the partitions 3 may be provided with longitudinal ribs 4 adjacent the margins of the partitions to provide resilient frictional contact with a flat shank 6 when it is inserted therebetween. These ribs are preferably closely adjacent the free end of the partition as shown and the outer ends of the partitions are preferably arcuate, as indicated at 5 (Fig. 4), whereby the knob may easily be centered and aligned with respect to the shank. That is, the open end of the knob may be placed against the shank and then rotated, which will cause the knob to be accurately aligned and will direct the shank between the partitions. The outer sides of the partitions 3 may also be provided with ribs 7, if desired, which are substantially in alignment with the ribs 3 and increase the rigidity of the partitions, or leaf springs, as the partitions may be termed for the purposes of this application.

Figure 5:
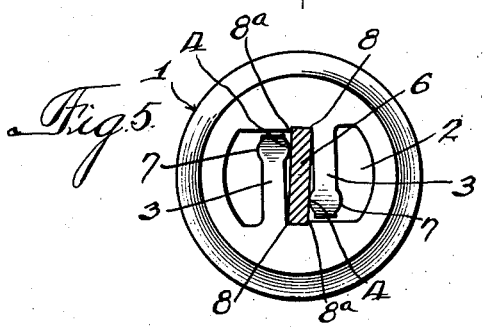
Fig. 5 is a bottom view of the knob with the shank shown in section on a line substantially corresponding to line 5—5 of Fig. 1.

In the embodiment disclosed, particularly in Fig. 5, the shank 6 is only slightly narrower than the recess 2 and of such thickness that, when inserted between the leaf springs 3, the outer edges of these springs are forced slightly outwardly by contact of the ribs 4 with the shank. The shank is therefore positioned in slightly angular relation to the partitions with opposite sides bearing against the rear of the partitions adjacent the wall of the knob as shown at 8. It will be apparent that, when the shank is forced between the leaf springs 3, the frictional contact of the ribs 4 will cause the shank to be clamped securely between the partitions 3 and the knob will be held sufficiently rigid for all operating purposes, but may be removed and replaced, when desired, by longitudinal movement over the end of the shank.

In Fig. 5 I have shown a knob provided with means to prevent twisting movement of the knob with respect to the stem from having a harmful effect. For this purpose, the knob is provided with shoulder portions 8a engaged by the adjacent side portions of the stem 6. This prevents twisting movement and prevents undue strain being transmitted to the spring members 3 when turning effort is exerted on the knob.

Figure 6:
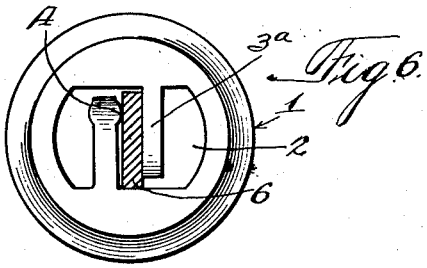
Fig. 6 is a bottom view of the knob with the shank shown in section and illustrates a slightly modified embodiment of the invention.

Fig. 6 illustrates a slightly different embodiment of the invention in which the longitudinal ribs 4 are omitted from the partition or leaf spring 3a. In this construction the entire surface of one side of the shank is engaged by the partition 3a and the opposite side is engaged by the longitudinal rib 4 in the same manner as previously described. In this embodiment the shank 6 will always be transversely parallel to the partition 3a and, therefore, any indicia on the knob may be accurately positioned relative to the shank.

Figure 7:
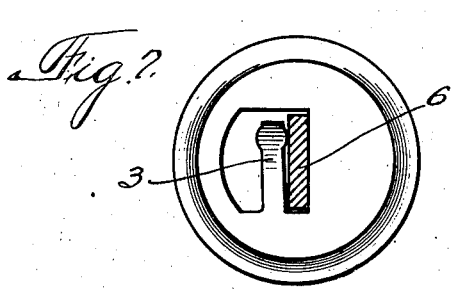
Fig. 7 illustrates still another embodiment of the invention wherein a single resilient engaging means is provided.

Fig. 7 illustrates an embodiment somewhat similar to that shown in Fig. 6. However, only one partition 3 is provided and this resilient partition tends to press the shank 6 snugly against the body of the knob as illustrated.

Figure 8:
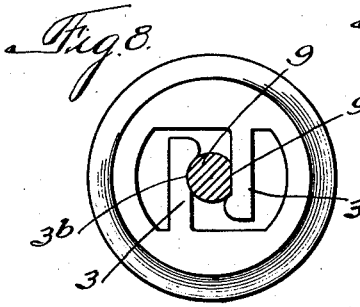
Fig. 8 illustrates the knob as applied to a round shank having a flattened side.
Figure 9:
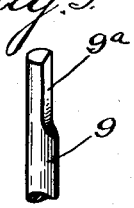
Fig. 9 illustrates one type of round shank to which the knob may be applied.

Fig. 8 illustrates an embodiment which is adapted to enable the knob to be applied to either flat shanks or round shanks having a flattened side. In this embodiment, one of the vertical partitions 3 may be provided with an arcuate longitudinal depression 3b to receive a round shank 9 as illustrated. The flattened side 9a of the shank will be engaged by the opposite partition and the knob will be retained in axial alignment on the shaft. By this construction, the flat side 10 will bear against one of the partitions and turning of the knob will be effectively prevented; also, a flat shank may be used in the same manner as previously described.

It will be understood that, wherever the word knob is used in the claims, it is intended to cover all proper equivalents such as a handle or other element adapted to be secured to the end of a suitable shank.

Modifications may be made without departing from the spirit of the invention. It is desired, therefore, that the invention be limited only by the prior art and the scope of the appended claims.

Having thus described this invention, what is claimed and desired to be secured by Letters Patent is:

1. In a frictionally retained knob for a shank, an integral molded base of "Bakelite" or the like having a recess therein to receive a shank, and resilient partitions extending transversely from opposite walls of said recess and adapted to receive a shank in resilient frictional engagement therebetween.

2. In a frictionally retained knob for a shank, an integral molded base of "Bakelite" or the like having a recess therein to receive a shank, and resilient partitions extending transversely from opposite walls of said recess and adapted to receive a shank in resilient frictional engagement therebetween, said partitions terminating in spaced relation to opposite sides of said recess.

3. In a frictionally retained knob for a shank, an integral molded base of "Bakelite" or the like having a recess therein to receive a shank, and resilient partitions extending transversely from opposite walls of said recess and adapted to receive a shank in resilient frictional engagement therebetween, said partitions terminating in spaced relation to opposite sides of said recess and having their outer ends inclined inwardly toward the bottom of the recess to facilitate the insertion of the end of the shank.

4. In a frictionally retained knob for a shank, an integral molded base of "Bakelite" or the like having a recess therein to receive a shank, and resilient partitions extending transversely from opposite walls of said recess and adapted to receive a shank in resilient frictional engagement therebetween, the outer edges of said partitions converging toward each other inwardly so that rotary movement thereof on the end of a flat shank will direct the end of said shank into the space between said partitions.

5. The combination with a metal shank having flat surfaces on opposite sides thereof, of a knob of molded plastic material having a recess therein to receive the end of the shank, and means for holding the end of the shank in the recess comprising a leaf spring member integral with said knob and frictionally engaging one of said flat surfaces and flexible about an axis extending longitudinally of the shank, said leaf spring member having a rib thereon extending longitudinally of the shank and engaging a flat surface of the shank.

6. The combination with a flat metal shank of a one-piece knob of molded insulating material having a longitudinal recess therein substantially the width of said shank whereby said knob is aligned laterally with the edges of said shank, and materially wider than the thickness of said shank, and spring fingers in said recess and resiliently engaging the sides of said shank whereby said knob is removably retained in axial alignment on said shank.

7. The combination with a metal shank, of a knob of molded plastic material having a cup-like recess therein, a side wall of which engages an edge of the shank to maintain the shank and knob in alignment, said knob having a molded spring tongue of insulating material integral with and extending into said recess from the side wall thereof and flexible about the junction between the wall and spring tongue, the side of said spring tongue resiliently engaging the side of the shank to grip it in position.

8. The combination with a metal shank, of a knob of molded plastic material having a cup-like recess therein, said knob having a molded spring tongue of insulating material integral with and extending into said recess from the side wall thereof and flexible about the junction between the wall and spring tongue, the side of said spring tongue resiliently engaging the side of the shank to grip it in position.

CLAIR J. TERRILL.